US010210682B2

(12) United States Patent
Burdenko et al.

(10) Patent No.: US 10,210,682 B2
(45) Date of Patent: Feb. 19, 2019

(54) SYSTEMS AND METHODS FOR IMPROVING A SENSING ABILITY OF AN INTERLOCK SWITCH SYSTEM

(71) Applicant: ROCKWELL AUTOMATION TECHNOLOGIES, INC., Mayfield Heights, OH (US)

(72) Inventors: Michael N. Burdenko, Wellesley, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1356 days.

(21) Appl. No.: 14/018,886

(22) Filed: Sep. 5, 2013

(65) Prior Publication Data

US 2015/0061822 A1 Mar. 5, 2015

(51) Int. Cl.

| | |
|---|---|
| ***G05B 19/00*** | (2006.01) |
| ***G07C 9/00*** | (2006.01) |
| ***H01H 9/28*** | (2006.01) |
| ***H01H 27/00*** | (2006.01) |

(52) U.S. Cl.
CPC ...... *G07C 9/00111* (2013.01); *G07C 9/00896* (2013.01); *H01H 9/285* (2013.01); *H01H 27/00* (2013.01)

(58) Field of Classification Search
CPC ..... G07C 9/00309; H01H 9/285; H01H 27/00
USPC ................................ 340/572.5, 5.61; 70/277
See application file for complete search history.

(56) References Cited

U.S. PATENT DOCUMENTS

| | | | | |
|---|---|---|---|---|
| 5,574,470 A * | 11/1996 | de Vall | G06K 7/10336 | 340/572.7 |
| 5,604,485 A * | 2/1997 | Lauro | G06K 19/0672 | 340/10.42 |
| 6,069,564 A | 5/2000 | Hatano et al. | | |
| 7,746,233 B2 * | 6/2010 | Fleiner | G01D 5/2066 | 340/545.1 |
| 7,965,186 B2 * | 6/2011 | Downie | G02B 6/38 | 235/375 |
| 8,692,650 B2 * | 4/2014 | Pollabauer | G07C 9/00309 | 340/5.61 |

(Continued)

FOREIGN PATENT DOCUMENTS

| | | |
|---|---|---|
| CA | 2824844 A1 | 7/2012 |
| CN | 1868123 A | 11/2006 |

(Continued)

OTHER PUBLICATIONS

Extended EP95899RK900ams Search Report dated Jan. 20, 2015.

(Continued)

*Primary Examiner* — Vernal U Brown
(74) *Attorney, Agent, or Firm* — Fletcher Yoder, P.C.

(57) ABSTRACT

A system for improving a sensing ability of an interlock switch system may include an interlock switch and a target component. The interlock switch may include a first antenna coil that may receive one or more signals from one or more antenna coils within a sensing range of the first antenna coil. The target component may include an actuator that may interface with the interlock switch. The target component may also include at least two antenna coils. Each of the at least two antenna coils may then include an electronic identification (ID) associated with the target component.

20 Claims, 5 Drawing Sheets

(56) References Cited

U.S. PATENT DOCUMENTS

| | | | | |
|---|---|---|---|---|
| 9,177,735 | B2 * | 11/2015 | Mohtasham | H01H 9/285 |
| 2008/0105174 | A1 * | 5/2008 | Wijnveld | G07D 11/0096 109/50 |
| 2010/0014207 | A1 * | 1/2010 | Finkenzeller | G07C 9/00182 361/143 |
| 2011/0193663 | A1 | 8/2011 | Peczalski et al. | |
| 2014/0035793 | A1 * | 2/2014 | Kato | H01Q 1/243 343/867 |
| 2015/0322694 | A1 * | 11/2015 | Carr | G07C 9/00896 70/277 |

FOREIGN PATENT DOCUMENTS

| | | | |
|---|---|---|---|
| CN | 1902821 | A | 1/2007 |
| JP | 20097771 | A | 1/2009 |

OTHER PUBLICATIONS

TLS-Z GD2 Safety Guard Locking Switches, pp. 1-2, Sep. 2012, Web: www.literature.rockwellautomation.com/idc/groups/literature/documents/pp/440gz-pp001_-en-p.pdf.

Tongue Switch with Guard Locking & Rfid Coding KLTM-RFID & KLT-SS-RFID Operating Instructions, pp. 1-2, Feb. 2013, Web: www.itemsafety.com/product.asp?catid=165&areaid=&prodid=180&showProds=true.

Chinese Office Action for CN Application No. 201410452674.5 dated Sep. 2, 2016; 9 Pages

* cited by examiner

SYSTEMS AND METHODS FOR IMPROVING A SENSING ABILITY OF AN INTERLOCK SWITCH SYSTEM

BACKGROUND

Embodiments of the present disclosure relate generally to an interlock switch system that may guard or prevent personnel from entering hazardous areas. More specifically, the present disclosure relates to improving a sensing ability of an interlock switch that may use electromagnetic fields and signals as a mechanism for controlling an operation of the interlock switch.

Industrial automation systems may employ various types of electronic devices such as an alternating current (AC) drive, a motor, a robot, or the like to perform various industrial processes. Generally, to perform these industrial processes, the machines of the industrial automation system may exert a large amount of force, operate at extremely high speeds, and the like. As such, the environment in which these machines operate is potentially hazardous for human operators to enter. Keeping this in mind, an interlock switch coupled to a gate enclosing a potentially hazardous area of the industrial automation system may be used to prevent humans from entering the area when a dangerous condition may be present.

To operate the interlock switch, a target component or key that corresponds to the interlock switch may be inserted into the interlock switch. When the target component is inserted into the interlock switch, a sensing circuitry in the interlock switch may verify whether the inserted target component is the appropriate target component to operate the switch based on an electronic identification (ID) of the target component. Accordingly, it is now recognized that improved systems and methods for ensuring that a sensing circuit in the interlock switch senses electronic IDs of target components inserted into the interlock switch are desirable.

BRIEF DESCRIPTION

In one embodiment, a system for improving a sensing ability of an interlock switch system may include an interlock switch and a target component. The interlock switch may include a first antenna coil that may receive one or more signals from one or more antenna coils within a sensing range of the first antenna coil. The target component may include an actuator that may interface with the interlock switch. The target component may also include at least two antenna coils. Each of the at least two antenna coils may then include an electronic identification (ID) associated with the target component.

In another embodiment, a method for operating an interlock switch may include receiving an electronic identification (ID) associated with a target component that may interface with the interlock switch. Here, the electronic ID may be emitted from two antenna coils disposed within the target component when the target component is inserted into an opening of the interlock switch. The method may then include determining whether the electronic ID is associated with operating the interlock switch. The method may then send a command to lock the interlock switch when the electronic ID is associated with operating the interlock switch.

In yet another embodiment, a target component that may be used to operate an interlock switch may include an actuator that may interface with the interlock switch. The target component may also include at least two antenna coils comprising an electronic identification (ID) associated with the target component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards an interlock switch and a target component used to operate the interlock switch. More specifically, embodiments of the present disclosure are directed towards employing multiple antenna coils in a target component used to operate an interlock switch. Each antenna coil disposed within a respective target component may include an electronic identification (ID) or tag that may be used to identify the respective target component. As such, when the target component is inserted into the interlock switch, a sensing circuit within the interlock switch may detect the electronic ID of the inserted target component via an antenna coil disposed within the interlock switch. The sensing circuit may then use a processor to determine whether the received electronic ID corresponds to a valid target component that may be used to operate the interlock switch. By using multiple antenna coils in the target component, the sensing circuit may be better equipped to detect the electronic ID of the target component when the target component is inserted into the interlock switch despite the location of the antenna coil inside the interlock switch.

Figure 1:
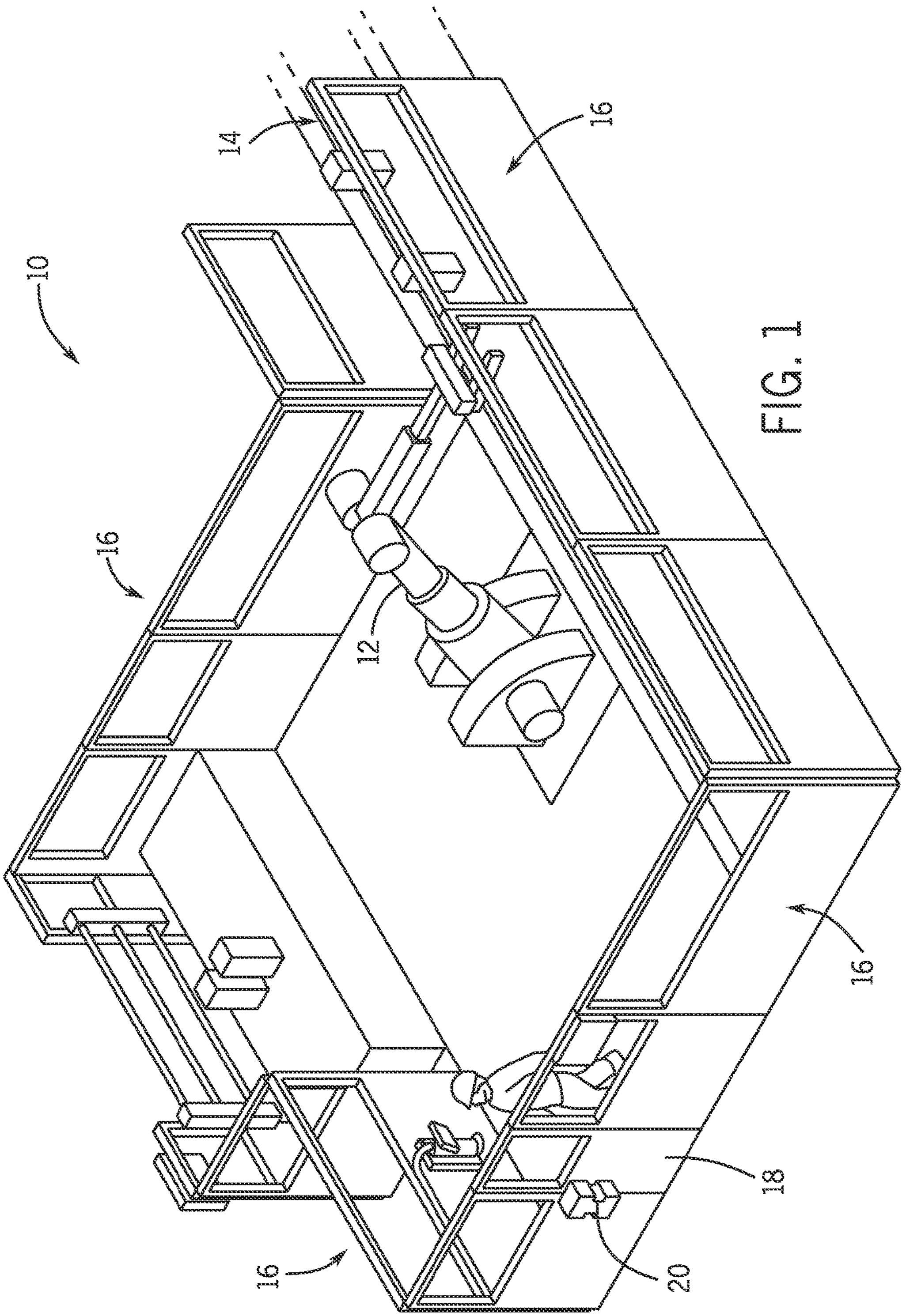
FIG. 1 illustrates a perspective view of an example industrial automation environment, in accordance with embodiments presented herein.

By way of introduction, FIG. 1 illustrates a perspective view of an example industrial automation environment 10. As shown in the figure, the industrial automation environment 10 may include various industrial machines that may be used to produce different products, perform various types of chemical processing, or the like. As shown in the figure, the industrial automation system may include various machines such as a robot 12, a conveyor belt 14, and the like. Generally, the machines employed in the industrial automation environment 10 may be capable of exerting large amounts of force, operate at very high speeds, and the like. For instance, the machines may include high inertia rotating machines, fast rotating machines, machines where high pressure may be released from pneumatic valves, and the like. As such, various safety precautions may be implemented in the industrial automation environment 10 to ensure that personnel operating or maintaining the machines in the industrial automation environment 10 are safe.

For instance, the industrial automation environment 10 may be enclosed by a wall 16, such that the machines in the industrial automation environment 10 may operate within a space defined by the wall 16. Human operators and other personnel may gain entry into the industrial automation system 10 via a gate 18. In one embodiment, the gate may be locked using an interlock switch system 20. In certain situations, dangers associated with the machines in the industrial automation environment 10 may not cease immediately after they receive a stop request. Instead, many machines in the industrial automation environment 10 may take some time after receiving the stop request before they stop moving or become safe for humans to approach. As such, the interlock switch system 20 may be used to protect personnel from dangerous conditions that may still be present immediately after the machines in the industrial automation environment 10 receive a stop request.

Figure 2:
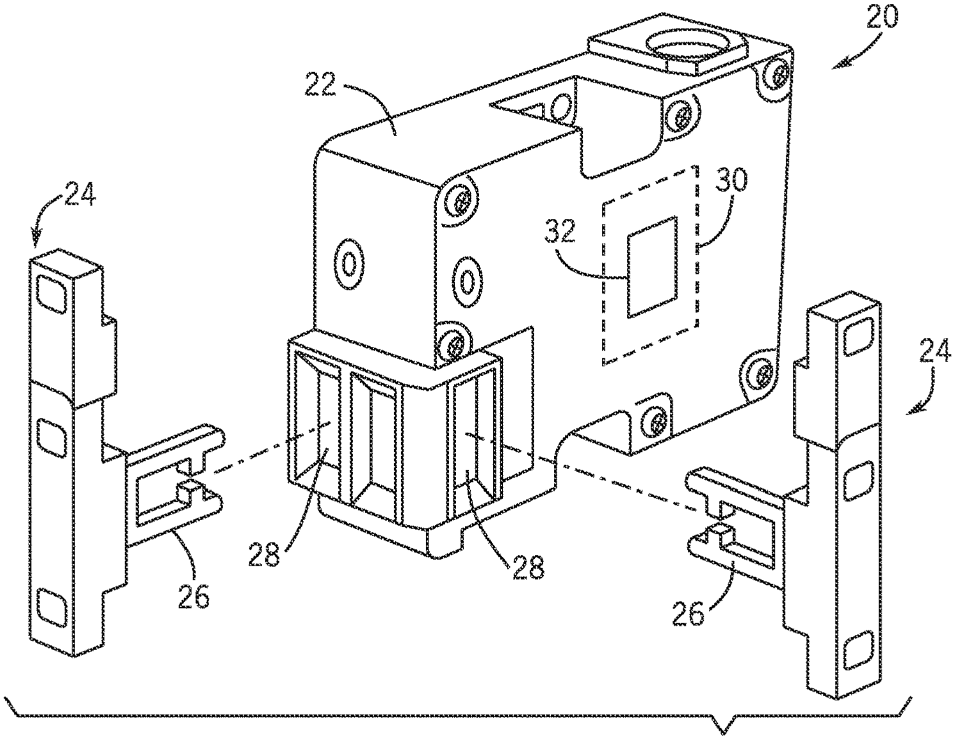
FIG. 2 illustrates a perspective view of an interlock switch system that may be employed in the industrial automation system of FIG. 1, in accordance with embodiments presented herein.

Keeping the foregoing in mind, FIG. 2 illustrates a perspective view of the interlock switch system 20. The interlock switch system 20 may include a switch 22 and a target component 24. The switch 22 may be an electromechanical switch that may lock the gate 18 or any other door-type apparatus. The target component 24 may be a mechanism used to engage and disengage the switch 22. As such, the target component 24 may include an actuator 26 that may interface with the switch 22 and cause the switch 22 to lock when the target component 24 is inserted into an opening 28 of the switch 22.

In certain embodiments, the switch 22 may be designed to operate when a particular target component 24 is inserted into the switch 22. For instance, the switch 22 may include sensing circuitry 30 that may be used to sense various types of signals such as radio waves that may be emitted nearby. As such, the target component 24 may include an electrical component such as an antenna coil that may be used to identify the target component 24. That is, the antenna coil of the target component 24 may include an electronic identification (ID) or tag (e.g., radio-frequency identification tag) that may be used to identify the respective target component 24. Here, when the target component 24 approaches the opening 28, the sensing circuit 30 may detect the electronic ID tag of the target component 24 when the antenna coil of the target component 24 is within a sensing range of the sensing circuit 30. The sensing circuit 30 may then use a processor 24 to determine whether the inserted target component 24 is the appropriate target component 24 to cause the switch 22 to lock.

As mentioned above, in order for the sensing circuit 30 to detect the electronic ID of the target component 24, the antenna coil of the target component 24 should be within the sensing range of the sensing circuit 30. The sensing range of the sensing circuit 30 may correspond to a range in which an antenna coil coupled to the sensing circuit 24 may be able to detect radio waves, electromagnetic fields, or the like emitted from an antenna coil disposed on the target component 24. As such, the antenna coil of the target component 24 should be positioned in the target component 24, such that it may be sensed by the antenna coil of the switch 22 whenever the target component 24 is inserted into the opening 28 of the switch 22. Keeping this in mind, FIG. 3 illustrates an internal view of the switch 22 and the target component 24 in an interlock switch system 40.

Figure 3:
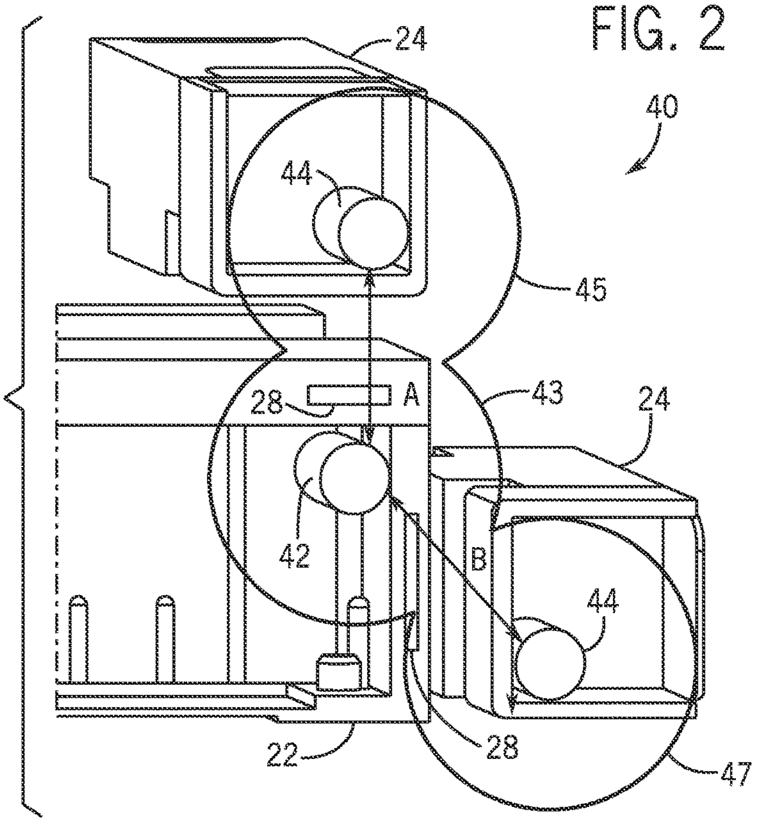
FIG. 3 illustrates an internal view of an interlock switch system of FIG. 2, in accordance with embodiments presented herein.

As shown in FIG. 3, the switch 22 may include an antenna coil 42 and each target component 24 may include an antenna coil 44. The antenna coil 42 and the antenna coil 44 may be inductor coils that may transmit a radio frequency carrier signal (e.g., electronic ID tag), receive data signals from another antenna coil, or both. In one embodiment, the antenna coil 44 may send an electronic ID (e.g., radio frequency identification tag) associated with the respective target component 24 out such that the antenna coil 42 of the switch 22 may receive the electronic ID. Here, the sensing circuit 30 may receive the respective electronic ID and may use the processor 32 to determine whether the sensed electronic ID matches an expected electronic ID. If the sensed electronic ID matches the expected electronic ID, the processor 32 may send a command to the switch 22 to lock. Alternatively, if the sensed electronic ID does not match the expected electronic ID, the switch 22 may not lock.

Generally, the antenna coil 42 may be located adjacent to an edge (e.g., corner) of the switch 22 such that when the target component 24 is inserted into either of the openings 28 of the switch 22, the antenna coil 44 of the target component 24 may be within a sensing range of the antenna coil 42. In the same fashion, the antenna coil 44 may be located adjacent to an edge or a corner of the target component 24. In any case, since the size of the antenna coil 42 may be limited by the size of the switch 22 and the components within the switch 22, the antenna coil 42 and the antenna coil 44 may be positioned within the switch 22 and the target component 24 to minimize the sensing range used by the antenna coil 42 to sense signals from the antenna coil 44.

Keeping this in mind and referring briefly to FIG. 2, the target component 24 may be inserted into the switch 22 from two different sides of the switch 22. However, the distance between the antenna coil 44 of the target component 24 and the antenna coil 42 of the switch 22 may be different depending on which side of the switch 22 is the target component 24 inserted. For example, referring back to FIG. 3, when a first target component 24 is inserted into a first opening 28, the distance between the antenna coil 44 of a first target component 24 and the antenna coil 42 of the switch 22 may be designated as the distance A. In the same manner, when a second target component 24 is inserted into a second opening 28, the distance between the antenna coil 44 of the second target component 24 and the antenna coil 42 of the switch 22 may be designated as the distance B. As shown in FIG. 3, the distance A between the antenna coil 44 of the first target component 24 and the antenna coil 42 of the switch 22 may be smaller that the distance B between the antenna coil 44 of the second target component 24 and the antenna coil 42 of the switch 22. Keeping this in mind, in certain circumstances, the sensing range of the antenna 42 (electric field 43) may be sufficient to receive signals from the antenna coil 44 (via electric field 45) located distance A away from the antenna coil 42 but may not be sufficient to receive signals from the antenna coil 44 (via electric field 47) located distance B away from the antenna coil 42. As such, the sensing circuit 30 may not ever detect the electronic ID of the target component 24 if the target component 24 is not inserted into a particular opening 28.

Figure 4:
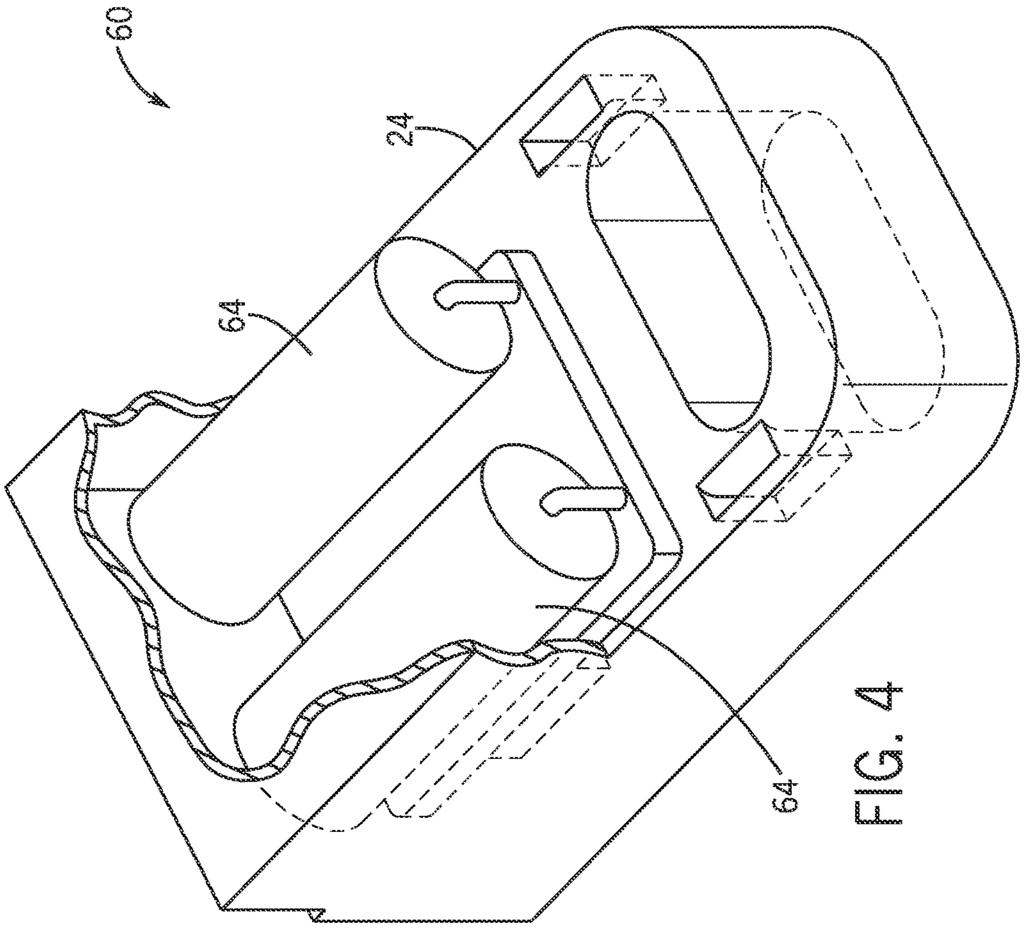
FIG. 4 illustrates an inner-top view of a target component having multiple antenna coils used with the interlock switch system of FIG. 2, in accordance with embodiments presented herein.

Accordingly, to provide an equal sensing range of the antenna coil 42 for sensing the antenna coil 44 of the target component 24 when the target component 24 is inserted into either opening 28 of the switch 22, multiple antenna coils may be used as the antenna coil 44 of the target component 24. For instance, FIG. 4 illustrates an inner-top view 60 of the target component 24 having two antenna coils 64. In one embodiment, the two antenna coils 64 may be positioned parallel with each other and may be electrically coupled in series with each other. As a result, when the target component 24 is inserted from either opening 28 of the switch 22, an electric field strength between the antenna coil 64 of the target 24 and the antenna coil 42 of the switch 22 may be approximately equal regardless of which opening 28 that the target component 24 has been inserted.

Figure 5:
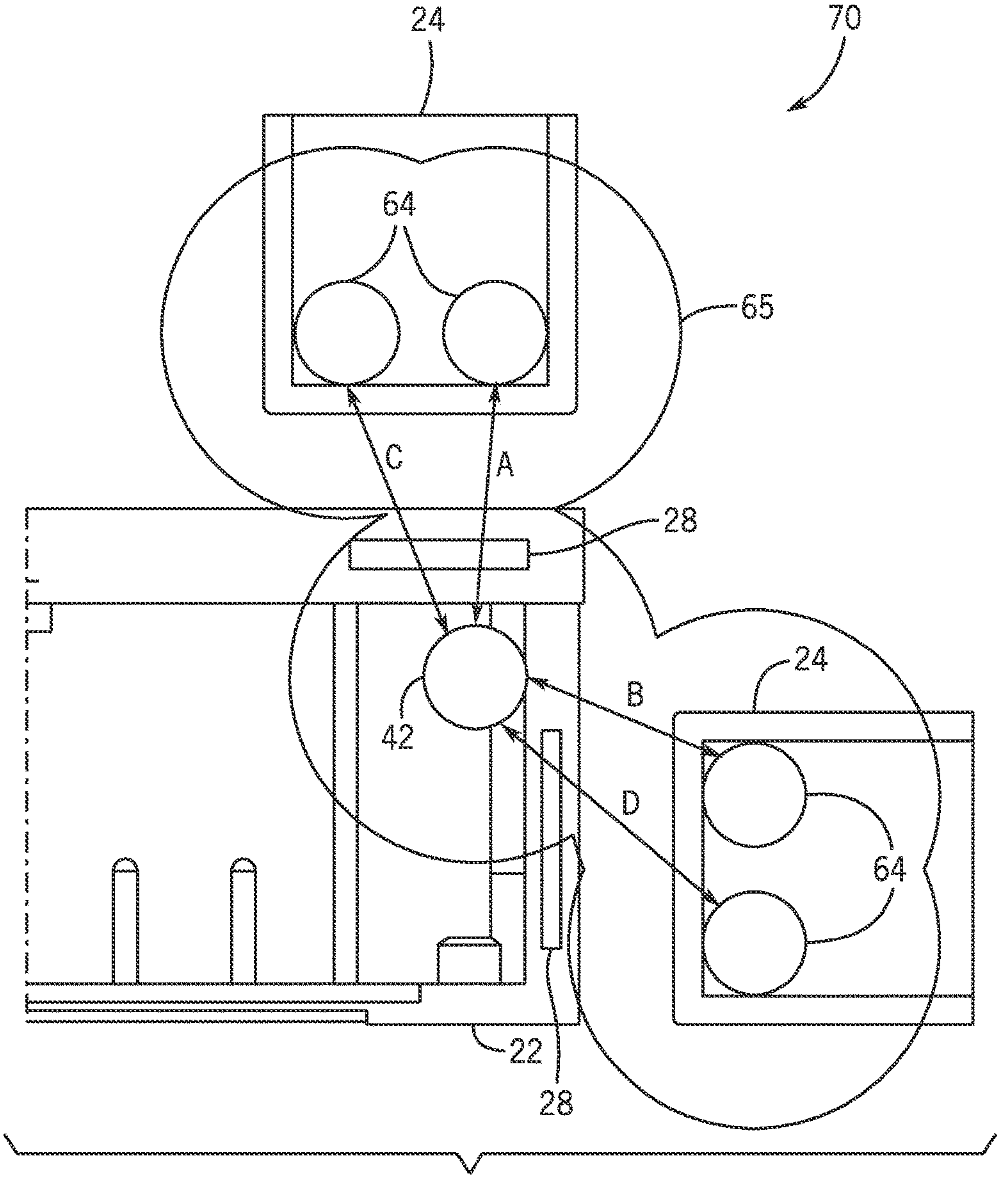
FIG. 5 illustrates an internal view of the target component of FIG. 4 used in the interlock switch system FIG. 2, in accordance with embodiments presented herein.

FIG. 5 illustrates an internal view of an interlock switch system 70 that depicts two target components 24 inserted into two different openings 28 of the switch 22, such that each target component 24 includes two antenna coils 64 as described above with reference to FIG. 4. As shown in FIG. 5, in one embodiment, each antenna coil 64 of the respective target component 24 may be positioned adjacent to opposite edges of the target component 24. By utilizing two antenna coils 64 in each target component 24, the distance between the antenna coil 64 closest to the antenna coil 42 when the target component 24 is inserted in either opening 28 may be approximately the same. In other words, the distance A between the closest antenna coil 64 of a first target component 24 and the antenna coil 42 of the switch 22 may be approximately equal to the distance B between the closest antenna coil 64 of a second target component 24 and the antenna coil 42 of the switch 22. In this manner, regardless of which opening 28 that the target component 24 is inserted into, the sensing range of the antenna 42 should be sufficient to receive signals from the antenna coils 64 of the target component 24. Moreover, since each target component 24 may include two antenna coils 64, an electric field 65 between the antenna coils 64 and the antenna coil 42 may be approximately homogenous regardless of which opening 28 that the target component 24 is inserted.

Although the target component 24 has been described as using two antenna coils 62, it should be noted that, in some embodiments, the target component 24 may include more than two antenna coils 62. That is, the target component 24 may have multiple antenna coils, such that the electric field between antenna coils of the target component 24 and the antenna coil of the switch 22 may be homogenous when the target component 24 is inserted into the switch 22 in any direction. Moreover, by using multiple antenna coils, the target component 24 may be equipped to detected by the sensing circuit 30 of the switch 22 regardless of which side of the switch 22 that the target component 24 may be inserted.

Figure 6:
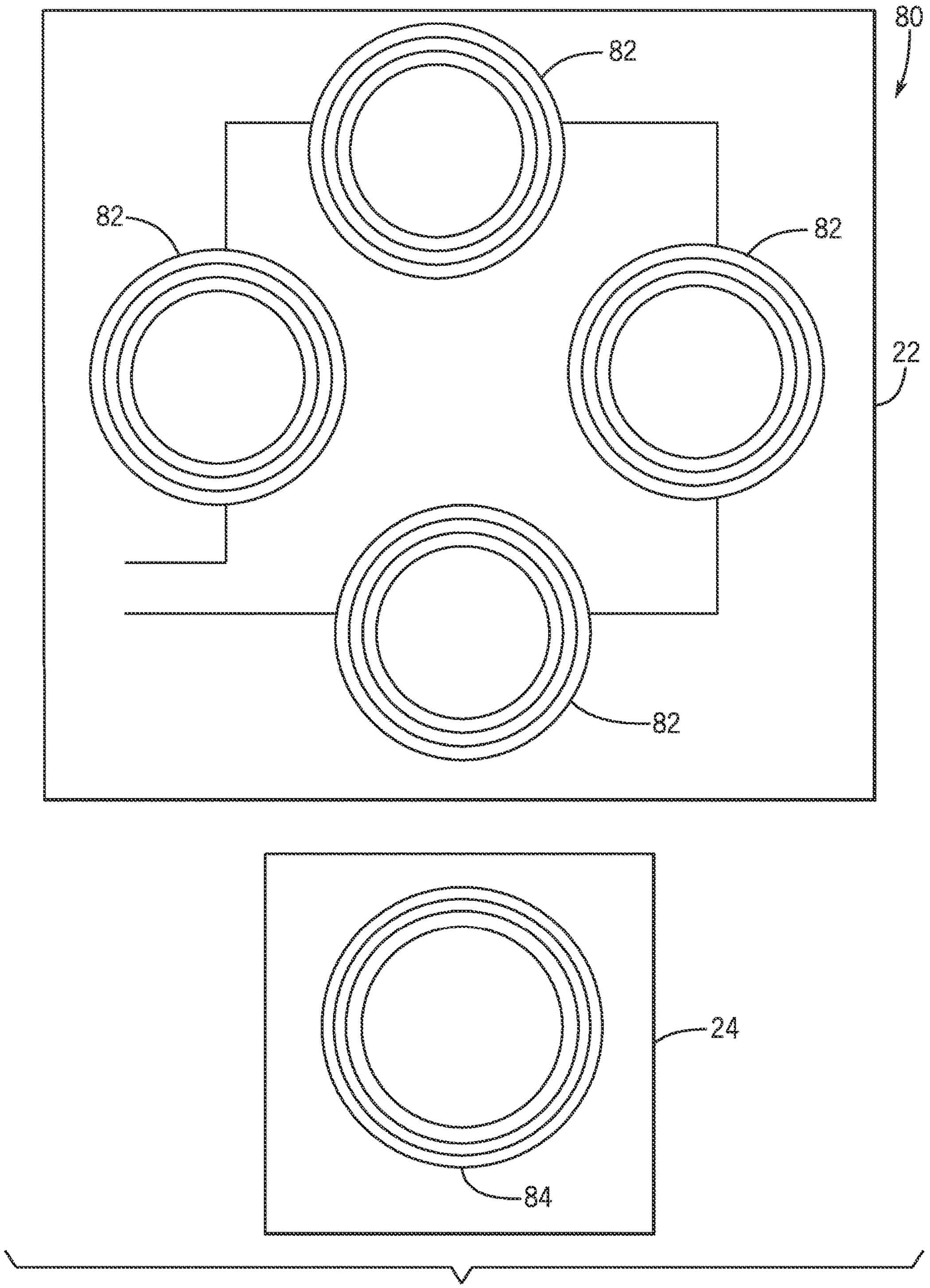
FIG. 6 illustrates an internal view of a switch and target component of FIG. 4 used in the interlock switch system FIG. 2, in accordance with embodiments presented herein.

In addition to employing multiple antenna coils as the antenna coil 44 of the target component 24, multiple antenna coils may also be used as the antenna coil 42 of the switch 22. For instance, FIG. 6 illustrates an internal view of an interlock switch system 80 that depicts the target component 24 adjacent to the switch 22. As shown in FIG. 6, the switch 22 may include four antenna coils 82 coupled in series. In one embodiment, each antenna coil 82 may be positioned adjacent to a wall of the switch 22. However, it should be noted that in other embodiments, each antenna coil 82 may be positioned at various locations within the switch 22, such as the corners of the switch 22 and the like.

In one embodiment, the target component 24 may include a single antenna coil 84. Here, the target component 24 may approach any side of the switch 22 and the sensing circuit 30 of the switch 22 may detect the electronic ID of the target component 24 via a respective antenna coil 82. In another embodiment, the target component 24 may approach any side of the switch 22, however, the antenna coil 84 may be align with one of the antenna coils 82 of the switch 22.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:

an interlock switch comprising at least two openings and at least one antenna coil configured to receive one or more signals from one or more antenna coils within a sensing range of the at least one antenna coil; and a target component, comprising:

an actuator configured to interface with the at least two openings of the interlock switch; and at least two antenna coils, wherein each of the at least two antenna coils comprises an electronic identification (ID) associated with the target component, and wherein the at least one antenna coil of the interlock switch receives the one or more signals from the at least two antenna coils when the actuator is disposed within any of the at least two openings.

2. The system of claim 1, wherein the electronic ID is transmitted to the at least one antenna coil of the interlock switch when the actuator is disposed within either of the at least two.

3. The system of claim 1, wherein the at least two antenna coils are disposed on opposite edges of the target component and are outside the interlock switch when the actuator is disposed within either of the at least two openings.

4. The system of claim 1, wherein the at least two antenna coils are disposed parallel with each other.

5. The system of claim 1, wherein the at least two antenna coils are electrically coupled in series with each other.

6. The system of claim 1, wherein the at least two openings comprise a first opening on a first side of the interlock switch and a second opening on a second side of the interlock switch, wherein the first opening and the second opening are configured to receive the actuator.

7. The system of claim 6, wherein the at least one antenna coil and the at least two antenna coils generate a homogenous electric field when the actuator is inserted into the first opening and when the actuator is inserted into the second opening.

8. The system of claim 1, wherein the interlock switch comprises a processor configured to:

receive the electronic ID associated with the target component when the at least two antenna coils are within the sensing range;

determine whether the electronic ID is associated with the interlock switch; and lock the interlock switch with the actuator when the electronic ID is associated with the interlock switch.

9. The system of claim 1, wherein the at least one antenna coil and the at least two antenna coils comprise inductor coils configured to send and/or receive radio waves.

10. The system of claim 1, wherein the at least one antenna coil of the interlock switch comprises only one antenna coil.

11. A method, comprising:

receiving an electronic identification (ID) associated with a target component configured to interface with an interlock switch, wherein the electronic ID is emitted from two antenna coils disposed within the target component when the target component is inserted into one opening of at least two openings in the interlock switch, wherein the at least two openings are configured to receive an actuator of the target component;

determining whether the electronic ID is configured to operate the interlock switch; and sending a command to the interlock switch when the electronic ID is configured to operate the interlock switch, wherein the command is configured to cause the interlock switch to lock.

12. The method of claim 11, wherein the one opening is positioned on a first side of the interlock switch or a second side of the interlock switch.

13. The method of claim 11, wherein the command is configured to cause an electro-mechanical switch that corresponds to the interlock switch to engage.

14. The method of claim 11, wherein the electronic ID comprises a radio-frequency identification tag associated with the target component.

15. The method of claim 11, wherein the electronic ID is received when the two antenna coils are within a sensing range of a first antenna coil disposed in the interlock switch, and wherein the two antenna coils are within the sensing range when the target component is disposed within any of the at least two openings.

16. A target component configured to operate an interlock switch, wherein the target component comprises:

an actuator configured to interface with the interlock switch comprising an antenna coil; and at least two antenna coils comprising an electronic identification (ID) associated with the target component, wherein the at least two antenna coils are configured to transmit a signal to the antenna coil of the interlock switch when the actuator is disposed within one of at least two openings disposed on the interlock switch.

17. The target component of claim 16, wherein the at least two antenna coils are disposed inside the target component parallel to each other.

18. The target component of claim 16, wherein the at least two antenna coils are configured to generate a homogenous electric field when the target component is inserted into any of the at least two openings of the interlock switch.

19. The target component of claim 16, wherein the at least two openings comprise a first opening and a second opening located on different sides of the interlock switch.

20. The target component of claim 16, wherein the at least two antenna coils are configured to emit radio waves comprising the electronic ID associated with the target component.

* * * * *